(12) United States Patent
Shida

(10) Patent No.: US 8,738,275 B2
(45) Date of Patent: May 27, 2014

(54) VEHICLE GROUP CONTROL METHOD AND VEHICLE

(75) Inventor: Mitsuhisa Shida, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 270 days.

(21) Appl. No.: 13/140,193

(22) PCT Filed: Jan. 23, 2009

(86) PCT No.: PCT/JP2009/051112
§ 371 (c)(1),
(2), (4) Date: Jun. 16, 2011

(87) PCT Pub. No.: WO2010/084608
PCT Pub. Date: Jul. 29, 2010

(65) Prior Publication Data
US 2011/0288754 A1    Nov. 24, 2011

(51) Int. Cl.
*G06F 7/00* (2006.01)
(52) U.S. Cl.
USPC ............................................ 701/117
(58) Field of Classification Search
USPC .......... 701/23, 24, 93, 96, 117, 118, 119
See application file for complete search history.

(56) References Cited

U.S. PATENT DOCUMENTS

| | | | | |
|---|---|---|---|---|
| 5,170,351 A | * | 12/1992 | Nemoto et al. | 701/23 |
| 5,777,451 A | * | 7/1998 | Kobayashi et al. | 318/587 |
| 6,032,097 A | * | 2/2000 | Iihoshi et al. | 701/96 |
| 6,167,331 A | * | 12/2000 | Matsumoto et al. | 701/23 |
| 6,301,530 B1 | * | 10/2001 | Tamura | 701/23 |
| 6,356,820 B1 | * | 3/2002 | Hashimoto et al. | 701/23 |
| 7,613,563 B2 | * | 11/2009 | Haegebarth et al. | 701/117 |
| 2010/0256836 A1 | * | 10/2010 | Mudalige | 701/2 |

FOREIGN PATENT DOCUMENTS

| | | |
|---|---|---|
| JP | 08-316770 A | 11/1996 |
| JP | A-10-162282 | 6/1998 |
| JP | A-10-261194 | 9/1998 |
| JP | A-11-066498 | 3/1999 |
| JP | A-2007-034382 | 2/2007 |
| JP | A-2008-003675 | 1/2008 |
| JP | A-2008-046820 | 2/2008 |

OTHER PUBLICATIONS

Translation of Sep. 22, 2011 International Preliminary Report on Patentability issued in International Application No. PCT/JP2009/051112.
International Search Report issued in Application No. PCT/JP2009/051112; Dated Mar. 3, 2009 (With Translation).

* cited by examiner

*Primary Examiner* — Khoi Tran
*Assistant Examiner* — Adam Mott
(74) *Attorney, Agent, or Firm* — Oliff PLC

(57) ABSTRACT

The invention provides a vehicle group control method that controls the traveling of a vehicle group including a plurality of vehicles. The vehicle group control method includes: a process of controlling vehicles in each of a plurality of small vehicle groups which are divided from the vehicle group and controlling the relative relationship between the vehicles in each small vehicle group using communication between the vehicles in the same small vehicle group; and a small vehicle group control process of controlling the relative relationship between the small vehicle groups using communication between representative vehicles in the small vehicle groups.

7 Claims, 10 Drawing Sheets

*Fig.8*
(a)
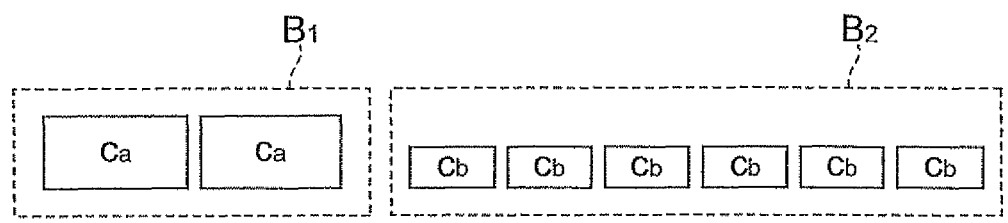
(b)
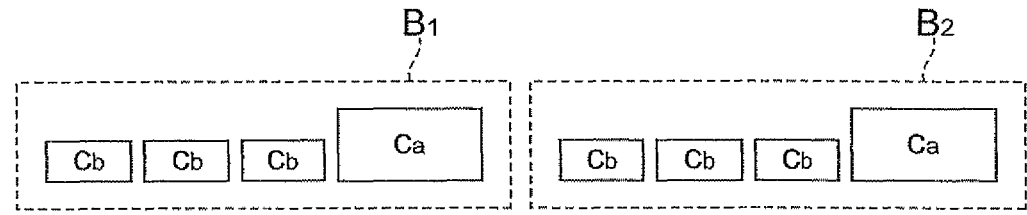

VEHICLE GROUP CONTROL METHOD AND VEHICLE

TECHNICAL FIELD

The present invention relates to a vehicle group control method that controls the traveling of a vehicle group including a plurality of vehicles and a vehicle to which the vehicle group control method is applied.

BACKGROUND ART

In recent years, in order to improve traffic flow and reduce air resistance to improve fuel efficiency, a technique has attracted attention which makes a plurality of vehicles travel in a row at a short inter-vehicle distance. As the technique for making the vehicles travel in a row (which is also referred to as a "vehicle group traveling technique"), a system disclosed in Japanese Unexamined Patent Application Publication No. 10-162282 has been proposed. In the system, each of the vehicles behind the first vehicle in a vehicle group controls the distance from the first vehicle to achieve vehicle group traveling using a plurality of vehicles. In this method, each of the vehicles behind the first vehicle rapidly responds to a disturbance applied to the first vehicle in the vehicle group. Therefore, an error in the inter-vehicle distance is not propagated and the row of the vehicles is not disarrayed.
Patent Literature 1: Japanese Unexamined Patent Application Publication No. 10-162282

SUMMARY OF INVENTION

Technical Problem

However, in the system disclosed in Patent Literature 1, since the first vehicle communicates with each of the other following vehicles, the maximum communication load is applied to the first vehicle in the vehicle group. When the number of vehicles forming the vehicle group increases, the amount of communication involving the first vehicle increases and it is difficult to perform smooth vehicle-to-vehicle communication. That is, it is not practical to apply this system to a plurality of vehicles, considering the data capacity in vehicle-to-vehicle communication, the communication period, and the range of access to communication.

The invention has been made in view of the above-mentioned problems and an object of the invention is to provide a vehicle group control method and a vehicle capable of reducing the communication load in the traveling control of a vehicle group.

Solution to Problem

According to an aspect of the invention, there is provided a vehicle group control method that controls the traveling of a vehicle group including a plurality of vehicles. The vehicle group control method includes: a step of controlling vehicles in each of a plurality of small vehicle groups which are divided from the vehicle group and controlling the relative relationship between the vehicles in each small vehicle group using communication between the vehicles in the same small vehicle group; and a small vehicle group control step of controlling the relative relationship between the small vehicle groups using communication between representative vehicles in the small vehicle groups.

According to this vehicle group control method, the relative relationship between the vehicles is controlled using vehicle-to-vehicle communication in each of the divided small vehicle groups. The relative relationship between the small vehicle groups is controlled by communication between the representative vehicles in the small vehicle groups. In this way, the relative relationship between the vehicles in the entire vehicle group is controlled. According to the vehicle group control method, the communication required for control in the small vehicle group is separated from the communication required to control the relative relationship between the small vehicle groups. Therefore, it is possible to reduce the communication load in the entire vehicle group.

In the small vehicle group control step, the relative relationship between the successive representative vehicles may be controlled using the communication between the successive representative vehicles.

In the small vehicle group control step, the relative relationship between a target vehicle selected from the vehicles in the vehicle group and each representative vehicle other than the representative vehicle in the small vehicle group including the target vehicle may be controlled using communication between the representative vehicle of the small vehicle group including the target vehicle and each representative vehicle other than the representative vehicle in the small vehicle group including the target vehicle.

According to this structure, the relative relationship between the target vehicle and each representative vehicle other than the representative vehicle in the small vehicle group including the target vehicle is controlled. Therefore, it is possible to prevent the propagation of error in the relative relationship between the representative vehicles. As a result, it is possible to prevent the propagation of error in the relative relationship between the small vehicle groups.

In the small vehicle group including the target vehicle, the target vehicle may be a first vehicle in the small vehicle group, and the representative vehicle may be selected from vehicles other than the first vehicle.

In this case, the target vehicle and the representative vehicle that communicates with the representative vehicles in other small vehicle groups are separately selected. Therefore, it is possible to prevent one vehicle from serving as both the target vehicle and the representative vehicle and thus prevent a communication load from being concentrated on a specific vehicle.

In the step of controlling the vehicles in the small vehicle group, the distance between the vehicles in the small vehicle group may be controlled. The number of vehicles in each small vehicle group may be determined by the error in the distance between the vehicles behind the first vehicle that can occur in correspondence with the acceleration of the first vehicle in the small vehicle group in the step of controlling the vehicles in the small vehicle group. According to this structure, it is possible to reduce the error in the inter-vehicle distance occurring in the small vehicle group to a desired value by limiting the number of vehicles in the small vehicle group.

In the step of controlling the vehicles in the small vehicle group, each distance between the vehicles in the small vehicle group may be controlled. In the small vehicle group control step, the distance between the representative vehicles may be controlled such that the distance between the successive small vehicle groups is different from the distance between the vehicles in each small vehicle group.

It is considered that the error in the distance between the last vehicles in the small vehicle groups increases when the distance between the vehicles in the small vehicle group and the distance between the representative vehicles are separately controlled. In contrast, according to the above-mentioned structure, the distance between the vehicles in the small vehicle group and the distance between the small vehicle groups are controlled to be different from each other. Therefore, it is possible to ensure a safe distance between the last vehicle in each small vehicle group and the first vehicle in a small vehicle group that is behind the small vehicle group by appropriately setting the distance between the small vehicle groups.

In the small vehicle group control step, the relative relationship between the representative vehicles may be controlled such that the distance between the successive small vehicle groups is a predetermined target distance. The predetermined target distance may be set on the basis of an inter-vehicle error propagation ratio, which is the propagation ratio of the error in the inter-vehicle distance propagated to the vehicles that are behind each vehicle, in the step of controlling the vehicles in the small vehicle group.

According to this structure, even when inter-vehicle error propagation occurs in the step of controlling the vehicles in the small vehicle group, it is possible to ensure a safe distance between the last vehicle in each small vehicle group and the first vehicle in a small vehicle group that is behind the small vehicle group.

According to another aspect of the invention, there is provided a vehicle that is used in a vehicle group control method of controlling the traveling of a vehicle group including a plurality of vehicles. The vehicle group control method includes: a step of controlling vehicles in each of a plurality of small vehicle groups which are divided from the vehicle group and controlling the relative relationship between the vehicles in each small vehicle group using communication between the vehicles in the same small vehicle group; and a small vehicle group control step of controlling the relative relationship between the small vehicle groups using communication between representative vehicles in the small vehicle groups. When a host vehicle is the representative vehicle in the small vehicle group, the host vehicle communicates with other representative vehicles in other small vehicle groups.

According to the vehicle group control method using the vehicle, the relative relationship between the vehicles is controlled using vehicle-to-vehicle communication in each of the divided small vehicle groups. The relative relationship between the small vehicle groups is controlled by communication between the representative vehicles in the small vehicle groups. In this way, the relative relationship between the vehicles in the entire vehicle group is controlled. According to the vehicle group control method, the communication required for control in the small vehicle group is separated from the communication required to control the relative relationship between the small vehicle groups. Therefore, it is possible to reduce the communication load in the entire vehicle group.

Advantageous Effects of Invention

According to the vehicle group control method and the vehicle of the invention, it is possible to reduce a communication load in the traveling control of a vehicle group.

BRIEF DESCRIPTION OF DRAWINGS

FIGS. 8(a) and 8(b) are diagrams illustrating an example of two small vehicle groups divided by a small vehicle group dividing process.

REFERENCE SIGNS LIST

1: VEHICLE GROUP TRAVELING CONTROL SYSTEM
$B_1, B_2, B_3, B_4$: SMALL VEHICLE GROUP
$C_{1,1}, C_{1,2}, C_{1,3}, C_{2,1}, C_{2,2}, C_{2,3}, C_{3,1}, C_{3,2}, C_{3,3}$: VEHICLE
$C_{1,1}, C_{2,1}, C_{3,1}, C_{4,1}$: FIRST VEHICLE
$Cs_1, Cs_2, Cs_3, Cs_4$: REPRESENTATIVE VEHICLE
Ct: TARGET VEHICLE
Z: LARGE VEHICLE GROUP

DESCRIPTION OF EMBODIMENTS

Hereinafter, a vehicle group control method and a vehicle according to exemplary embodiments of the invention will be described in detail with reference to the accompanying drawings.

First Embodiment

Figure 1:
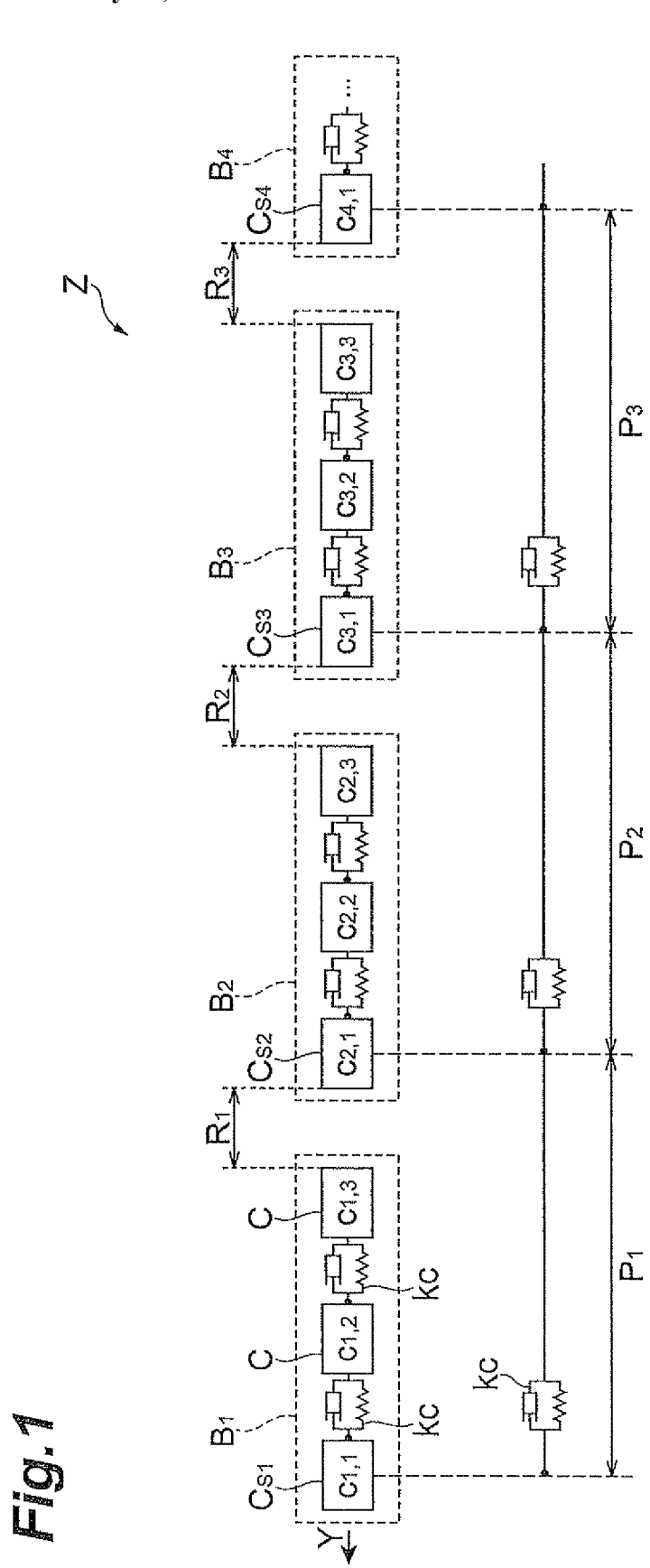
FIG. 1 is a diagram illustrating a plurality of vehicles divided into small vehicle groups in a vehicle group control method according to a first embodiment of the invention.

As shown in FIG. 1, a vehicle group control method according to this embodiment divides a large vehicle group Z including a plurality of vehicles C into small vehicle groups $B_1, B_2, B_3, \ldots$ each including a plurality of vehicles. The distance between the vehicles in each of the small vehicle groups is controlled. In addition, a representative vehicle that representatively performs vehicle-to-vehicle communication with other small vehicle groups is selected from each of the small vehicle groups, and the distance between the small vehicle groups is controlled by the communication between the representative vehicles. This control makes it possible to achieve vehicle group traveling in which a plurality of vehicles C travels in a row at a relatively small inter-vehicle distance in the entire large vehicle group Z. It is assumed that each of the vehicles C travels in the direction of an arrow Y in FIG. 1.

In the following description, as shown in FIG. 1, an n-th small vehicle group from the head of the large vehicle group Z is represented by "$B_n$" and an m-th vehicle from the head among the vehicles in the n-th small vehicle group $B_n$ is represented by "$C_{n,m}$" (n=1, 2, 3, . . . , and m=1, 2, 3, . . . ).

If necessary, the acceleration of the vehicle $C_{n,m}$ is represented by "$a_{n,m}$", the speed of the vehicle $C_{n,m}$ is represented by "$V_{n,m}$", and the acceleration command value of the vehicle $C_{n,m}$ is represented by "$u_{n,m}$". In addition, the distance between the vehicle $C_{n,m}$ and the vehicle $C_{n,m+1}$ is represented by "$L_{n,m}$" and an inter-vehicle error between the vehicle $C_{n,m}$ and the vehicle $C_{n,m+1}$ is represented by "$\Delta L_{n,m}$". The inter-vehicle error means the error between a target distance $L_{n,m\_tgt}$ between the vehicle $C_{n,m}$ and the vehicle $C_{n,m+1}$ and the actual inter-vehicle distance $L_{n,m}$. In addition, the distance between the last vehicle of the small vehicle group $B_n$ and the first vehicle of the small vehicle group $B_{n+1}$ is referred to as a "distance between the small vehicle groups" and is represented by "$R_n$".

In some cases, the vehicle $C_{n,1}$ that travels at the head among the vehicles forming the small vehicle group $B_n$ is referred to as a "first vehicle" and the vehicle $C_{n,2}$ and the subsequent vehicles following the first vehicle are generically referred to as the "following vehicles". In the large vehicle group Z, in some cases, the small vehicle group $B_1$ disposed at the head is referred to as a "first small vehicle group" and the small vehicle group $B_2$ and the subsequent small vehicle groups following the first small vehicle group are generically referred to as the "following small vehicle groups".

First, a vehicle group control system 1 that is provided in each of the vehicles forming the large vehicle group Z will be described.

Figure 2:
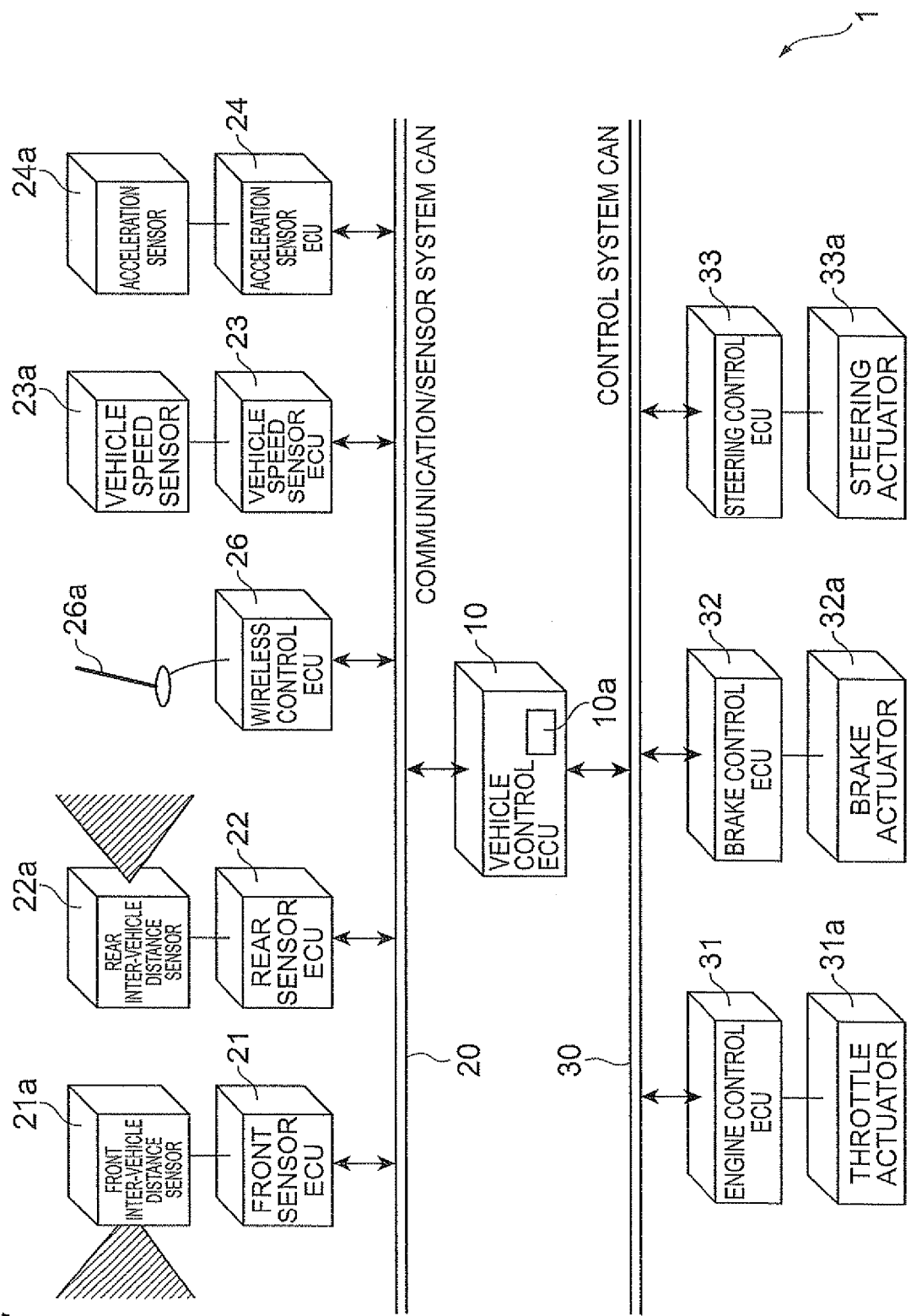
FIG. 2 is a block diagram illustrating a vehicle group control system included in each vehicle.

As shown in FIG. 2, the vehicle group control system 1 includes a vehicle control ECU (Electronic Control Unit) 10. The vehicle control ECU 10 is an electronic control unit that controls the overall operation of the vehicle group control system 1 and includes a computer including, for example, a CPU, a ROM, and a RAM as a main component. The vehicle control ECU 10 includes an information storage unit 10a that can store information temporarily or for a long time.

In addition, the vehicle group control system 1 includes sensors for detecting the traveling state of a host vehicle. The sensors include a front inter-vehicle distance sensor 21a, a rear inter-vehicle distance sensor 22a, a vehicle speed sensor 23a, and an acceleration sensor 24a.

The front inter-vehicle distance sensor 21a can detect the distance between the host vehicle and the vehicle that travels just in front of the host vehicle. Similarly, the rear inter-vehicle distance sensor 22a can detect the distance between the host vehicle and the vehicle that travels just on the rear side of the host vehicle. For example, millimeter wave radars that are provided on the front and rear sides of the vehicle are used as the front inter-vehicle distance sensor 21a and the rear inter-vehicle distance sensor 22a. The signal obtained by the front inter-vehicle distance sensor 21a is processed by a front sensor ECU 21 and is then transmitted as front inter-vehicle distance information to the vehicle control ECU 10. Similarly, the signal obtained by the rear inter-vehicle distance sensor 22a is processed by a rear sensor ECU 22 and is then transmitted as rear inter-vehicle distance information to the vehicle control ECU 10.

The vehicle speed sensor 23a can detect the speed of the host vehicle. For example, an electromagnetic pick-up sensor that detects a wheel speed is used as the vehicle speed sensor 23a. The signal obtained by the vehicle speed sensor 23a is processed by a vehicle speed sensor ECU 23 and is then transmitted as vehicle speed information to the vehicle control ECU 10. For example, a gas rate sensor or a gyro sensor is used as the acceleration sensor 24a. The signal obtained by the acceleration sensor 24a is processed by an acceleration sensor ECU 24 and is then transmitted as acceleration information to the vehicle control ECU 10.

The front sensor ECU 21, the rear sensor ECU 22, the vehicle speed sensor ECU 23, and the acceleration sensor ECU 24 are connected to the vehicle control ECU 10 through a communication/sensor system CAN 20 that is constructed as an in-vehicle network.

As described above, in the vehicle group control system 1, the sensors obtain the front inter-vehicle distance information, the rear inter-vehicle distance information, the vehicle speed information, and the acceleration information of the host vehicle. In the following description, in some cases, the front inter-vehicle distance information, the rear inter-vehicle distance information, the vehicle speed information, and the acceleration information are collectively referred to as "traveling state information".

In addition, the system 1 includes an engine control ECU 31, a brake control ECU 32, and a steering control ECU 33 in order to perform operations, such as the acceleration, deceleration, and steering of the host vehicle. The engine control ECU 31 receives acceleration command value information transmitted from the vehicle control ECU 10 and operates, for example, a throttle actuator 31a by an amount corresponding to the acceleration command value. In addition, the brake control ECU 32 receives the acceleration command value information and operates, for example, a brake actuator 32a by an amount corresponding to the acceleration command value. The steering control ECU 33 receives steering command value information transmitted from the vehicle control ECU 10 and operates, for example, a steering actuator 33a by an amount corresponding to the steering command value.

In addition, the vehicle group control system 1 includes a wireless antenna 26a and a wireless control ECU 26 in order to perform vehicle-to-vehicle communication with other vehicles C. In particular, the vehicles belonging to the same small vehicle group can exchange their information required to vehicle group traveling, such as vehicle specification information, traveling state information, and acceleration command value information, using vehicle-to-vehicle communication with the wireless antenna 26a and the wireless control ECU 26. In addition, the communication performed by the wireless antenna 26a and the wireless control ECU 26 is not limited to the communication between the vehicles in the same small vehicle group, but the wireless antenna 26a and the wireless control ECU 26 can perform the communication between the vehicles in different small vehicle groups. The wireless control ECU 26 is connected to the vehicle control ECU 10 through the communication/sensor system CAN 20.

Next, a vehicle group control method performed by the vehicle group control system 1 will be described. As shown in FIG. 1, an example in which three vehicles belong to each of the small vehicle groups $B_1$, $B_2$, $B_3$, ... will be described.

(Process of Controlling Vehicles in Small Vehicle Group)

First, as a process of controlling the vehicles in the small vehicle group, an inter-vehicle distance control process performed in each of the small vehicle groups $B_1$, $B_2$, $B_3$, ... will be described.

As shown in FIG. 1, in the small vehicle group $B_1$, each following vehicle $C_{1,j}$ (j=2, 3) follows a vehicle $C_{1,j-1}$ that travels just in front of the vehicle while controlling the distance $L_{1,j-1}$ from the vehicle $C_{1,j-1}$. Specifically, the vehicle control ECU 10 of each following vehicle $C_{1,j}$ performs vehicle-to-vehicle communication with the vehicle $C_{1,j-1}$ in front to obtain the acceleration $a_{1,j-1}$ of the vehicle $C_{1,j-1}$ in front. Then, the vehicle obtains a front inter-vehicle distance $L_{1,j-1}$ using the front inter-vehicle distance sensor 21a, feeds forward the acceleration $a_{1,j-1}$ of the vehicle $C_{1,j-1}$, and performs the feedback control of the front inter-vehicle distance $L_{1,j-1}$ using PD control. As such, in the following description, in a case in which a given vehicle controls the distance from a target vehicle that is in front of the vehicle, when the vehicle feeds forward the acceleration of the target vehicle in front and the state in which the vehicle follows the target vehicle in front using PD control is represented, it is assumed that the vehicle and the target vehicle are connected to each other by a spring damper unit kc including a spring with a spring constant k and a damper with an attenuation coefficient c, as shown in FIG. 1. In addition, in some cases, the relationship between the vehicle and the target vehicle is generally referred to as being "electronically connected to each other".

As described above, in the small vehicle group $B_1$, the acceleration and deceleration of each of the following vehicles $C_{1,2}$ and $C_{1,3}$ is controlled such that the front inter-vehicle distances $L_{1,1}$ and $L_{1,2}$ of the host vehicle are maintained. As a result, the three vehicles $C_{1,1}$, $C_{1,2}$, and $C_{1,3}$ in the small vehicle group $B_1$ travel while maintaining the positional relationship therebetween. Here, control performed in the first small vehicle group $B_1$ has been described above. However, the same control process as described above is performed in the following small vehicle groups $B_2$, $B_3$, $B_4$, . . . .

(Small Vehicle Group Control Process)

Next, as a small vehicle group control process, a traveling control process performed between the representative vehicles of the small vehicle groups $B_1$, $B_2$, $B_3$, . . . will be described. Here, the first vehicles $C_{1,1}$, $C_{2,1}$, $C_{3,1}$, . . . are selected as the representative vehicles $Cs_1$, $Cs_2$, $Cs_3$, . . . of the small vehicle groups $B_1$, $B_2$, $B_3$, . . . .

Each first vehicle $C_{h,1}$ (h=2, 3, . . . ), which is the representative vehicle $Cs_h$ of each following small vehicle group $B_h$, follows the first vehicle $C_{h-1,1}$ in the small vehicle group $B_{h-1}$ that is just in front of the small vehicle group $B_h$, while controlling the distance $P_{h-1}$ from the vehicle $C_{h-1,1}$. Specifically, the vehicle control ECU 10 of each first vehicle $C_{h,1}$ in each small vehicle group performs vehicle-to-vehicle communication with the first vehicle $C_{h-1,1}$ in front to obtain the acceleration $a_{h-1,1}$ of the vehicle $C_{h-1,1}$. Then, the vehicle $C_{h,1}$ obtains the distance $P_{h-1}$ between the vehicle $C_{h,1}$ and the target vehicle $C_{h-1,1}$ using the front inter-vehicle distance sensor 21a thereof, feeds forward the acceleration $a_{h-1,1}$ of the target vehicle, and performs the feedback control of the distance $P_{h-1}$ using PD control.

The distance $P_{h-1}$ may be obtained by the front inter-vehicle distance sensor 21a of the host vehicle. Alternatively, the vehicle may obtain the current location information of the vehicle $C_{h-1,1}$, which is a following target, using vehicle-to-vehicle communication and compare the obtained current location information with the current location information thereof to calculate the distance $P_{h-1}$. In order to calculate the distance $P_{h-1}$, the vehicle group control system 1 of each vehicle C may include a means (for example, a GPS apparatus) for detecting the current location information of the vehicle.

For the distance $P_{h-1}$, the target value $P_{h-1\_tgt}$ of the distance $P_{h-1}$ is appropriately set such that a sufficient distance $R_{h-1}$ is ensured between the small vehicle groups. The target value $P_{h-1\_tgt}$ is set to be more than the target value $L_{j\_tgt}$ of each inter-vehicle distance in the process of controlling the vehicles in the small vehicle group. The setting of the target value $P_{h-1\_tgt}$ will be described in detail below.

Figure 3:
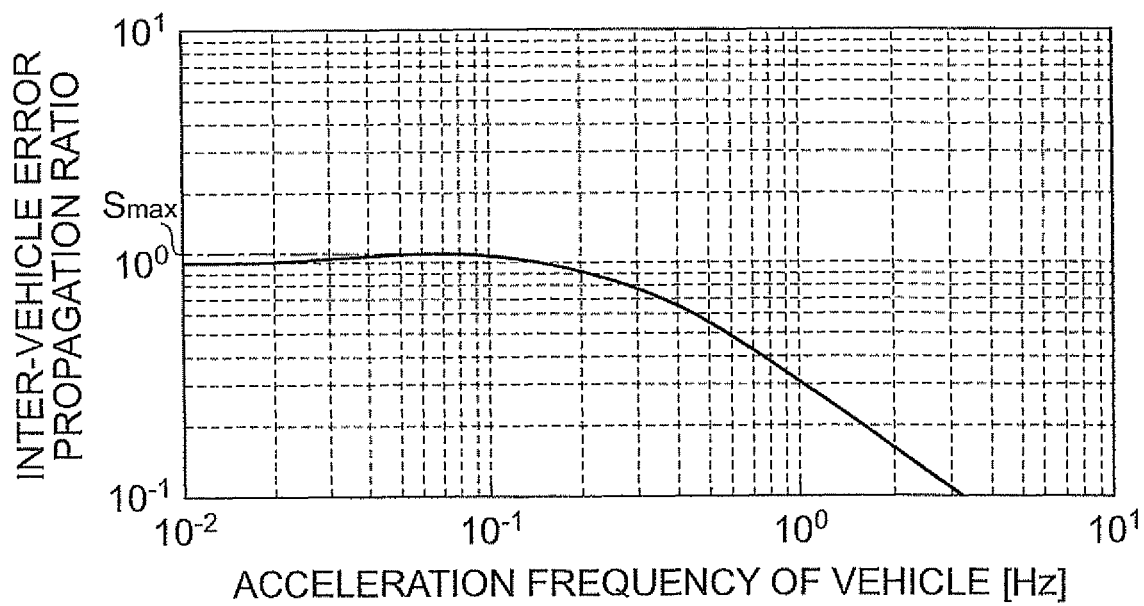
FIG. 3 is a graph illustrating an example of the relationship between the acceleration frequency of the vehicle and an inter-vehicle error propagation ratio.

In the process of controlling the vehicles in the small vehicle group $B_{h-1}$ in front, it is considered that error propagation in which an inter-vehicle error is sequentially propagated to the rear small vehicle group occurs due to the dead time of vehicle-to-vehicle communication, a delay in sensing, and a delay in the response of the vehicle. When the propagation ratio of the inter-vehicle error sequentially propagated to the rear inter-vehicle distance, that is, the ratio $\Delta L_{h-1,i+1}/\Delta L_{h-1,i}$ of an inter-vehicle error $\Delta L_{h-1,i+1}$ to an inter-vehicle error $\Delta L_{h-1,i}$ is an inter-vehicle error propagation ratio (string stability) S, the inter-vehicle error propagation ratio S depends on the acceleration frequency of the vehicle. For example, the relationship shown in FIG. 3 is established between the inter-vehicle error propagation ratio S and the acceleration frequency of the vehicle. In the example shown in FIG. 3, the inter-vehicle error propagation ratio S is the maximum when the acceleration frequency of the vehicle is approximately $6 \cdot 10^{-2}$ Hz. The maximum value $S_{max}$ of the inter-vehicle error propagation ratio is greater than 1 and is determined to be about 1.2.

When all of the vehicles in the small vehicle group $B_{h-1}$ have substantially the same acceleration and deceleration response, a maximum variation represented by the following Expression 1 occurs in the inter-vehicle distance $L_{h-1,n-1}$ between the last vehicle $C_{h-1,n}$ and a vehicle $C_{h-1,n-1}$ in the small vehicle group $B_{h-1}$ including n vehicles on the basis of the above-mentioned findings:

$$\Delta L_{h-1,n-1} = S_{max}^{n-1} \cdot \Delta L_{h-1,1}. \qquad [\text{Expression 1}]$$

Therefore, the distance $R_{h-1}$ between the small vehicle groups is set to be more than the inter-vehicle error $S_{max}^{n-1} \cdot \Delta L_{h-1,1}$ represented by Expression 1. That is, the target value $P_{h-1\_tgt}$ is set such that the distance $R_{h-1}$ between the small vehicle groups is more than the inter-vehicle error $S_{max}^{n-1} \cdot \Delta L_{h-1,1}$ on the basis of the maximum inter-vehicle error propagation ratio $S_{max}$. As such, a variation in the distance between the last vehicles in each small vehicle group $B_{h-1}$ is removed by the distance $R_{h-1}$ between the small vehicle groups while the inter-vehicle error propagation in each small vehicle group is allowed in the actual range. In this way, it is possible to perform safe vehicle group traveling in the entire large vehicle group Z.

According to the small vehicle group control process, the acceleration and deceleration of each representative vehicle $C_{1,h}$ (h=2, 3, . . . ) of each following small vehicle group $B_h$ are controlled such that the distance $P_{h-1}$ between the host vehicle and the representative vehicle $C_{1,h-1}$ that is in front of the host vehicle is maintained. As a result, the small vehicle groups $B_1$, $B_2$, $B_3$, . . . travel while the positional relationship therebetween is controlled. It is preferable that the communication between the representative vehicles in the small vehicle group control process be performed using a frequency channel different from that used in the vehicle-to-vehicle communication in the process of controlling the vehicles in the small vehicle group, in order to smoothly perform communication in the entire large vehicle group Z. In addition, the first vehicle $C_{1,1}$ in the first small vehicle group $B_1$ may be manually driven by the driver or it may be automatically driven on the basis of, for example, a predetermined traveling design.

As described above, according to this vehicle group control method, in the process of controlling the vehicles in the small vehicle group, control using vehicle-to-vehicle communication is performed in each of the divided small vehicle groups $B_1$, $B_2$, $B_3$, . . . to control the positional relationship between the vehicles in each small vehicle group. Then, the distance between the representative vehicles is controlled by the communication between the representative vehicles in each small vehicle group. As a result, the positional relationship between the small vehicle groups is controlled. According to this vehicle group control method, the vehicle-to-vehicle communication required for control in the small vehicle group is separated from the vehicle-to-vehicle communication required to control the positional relationship between the small vehicle groups. Therefore, the amount of communication in the entire vehicle group is reduced and it is possible to reduce a communication load.

In addition, according to this vehicle group control method, vehicle-to-vehicle communication may be performed only in the small vehicle group except for the representative vehicles. Therefore, it is possible to reduce communication capacity or a communication range and it is easy to apply the vehicle group control method to the actual traffic flow. Furthermore, according to this vehicle group control method, the distance between the vehicles in each of the divided small vehicle groups is controlled. Therefore, even when the inter-vehicle error is propagated, it is possible to prevent the inter-vehicle error propagation from being very widely spread in the entire large vehicle group Z. The vehicle group control method can achieve stable vehicle group traveling even when it is applied to the large vehicle group Z including, for example, several tens of vehicles or several hundreds of vehicles.

In this embodiment, the number of vehicles C belonging to one small vehicle group is 3, but the invention is not limited thereto. The number of vehicles C belonging to one small vehicle group $B_1$, $B_2$, $B_3$, . . . may be set considering the following.

First, it is assumed that a small vehicle group including n vehicles travels by a predetermined control method. In this case, the frequency characteristics (the gain of the inter-vehicle error and the phase delay) of the inter-vehicle error with respect to the acceleration of the first vehicle in the small vehicle group are calculated. It is assumed that five vehicles travel by the control method of the process of controlling the vehicles in the small vehicle group.

Figure 4:
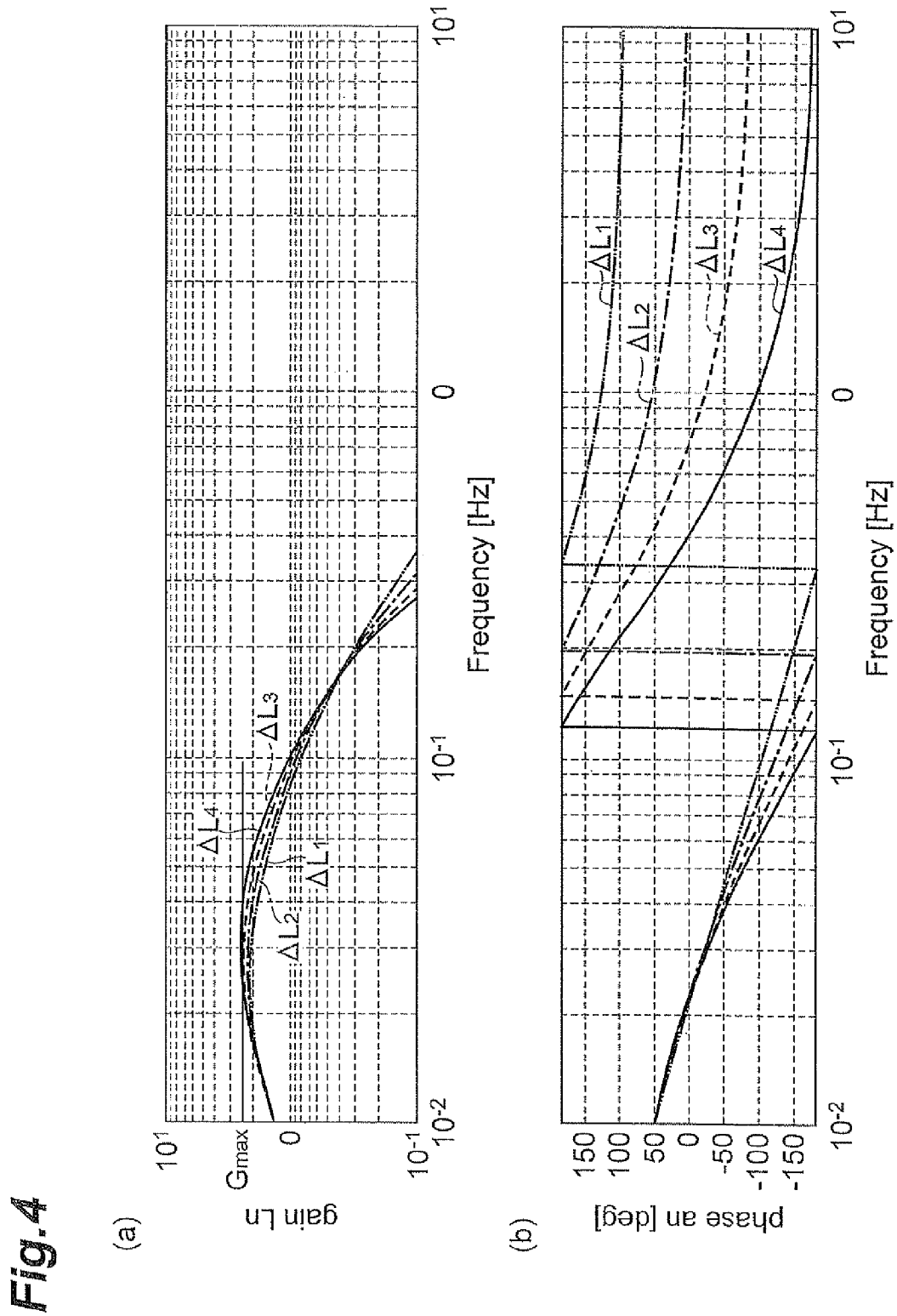
FIGS. 4(a) and 4(b) are Bode diagrams illustrating an inter-vehicle error in a process of controlling the vehicles in the small vehicle group.
Figure 5:
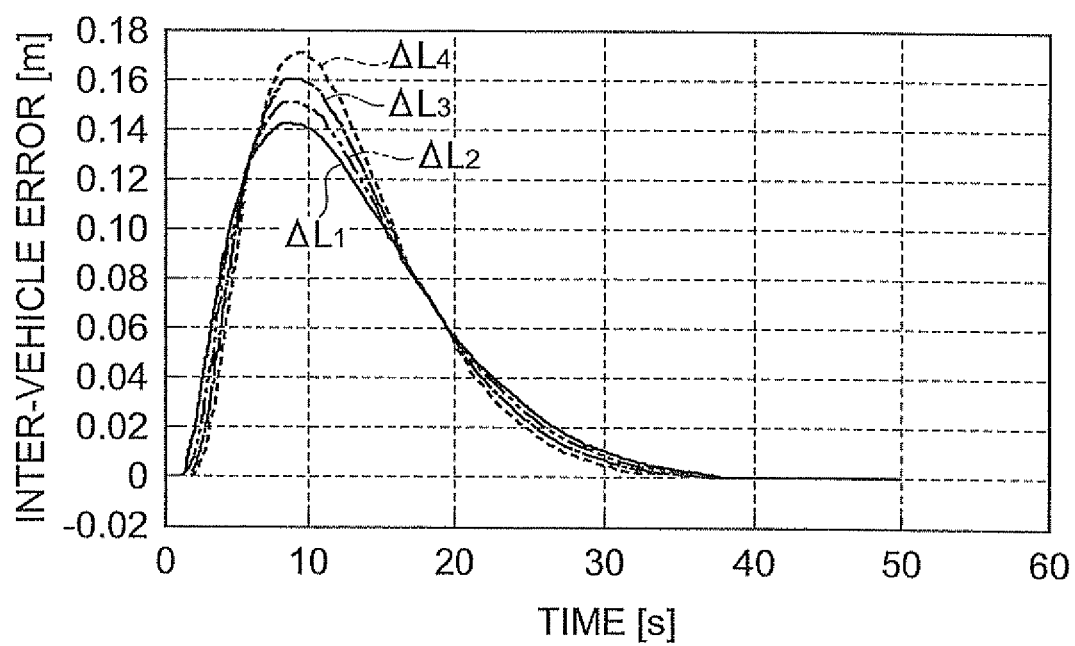
FIG. 5 is a graph illustrating an example of the inter-vehicle error transient characteristics of the inter-vehicle error to a following vehicle in the process of controlling the vehicles in the small vehicle group.

In this case, for example, FIGS. 4(*a*) and 4(*b*) are Bode diagrams illustrating the inter-vehicle error of a following vehicle with respect to the acceleration of the first vehicle. In FIG. 4, symbol $\Delta L_i$ (i=1, 2, 3, and 4) indicates a line related to the error $\Delta L_i$ between an i-th vehicle and an (i+1)-th vehicle in the small vehicle group. As can be seen from the Bode diagram, the gain (the inter-vehicle error [m]/the acceleration [m/s²] of the first vehicle) of the inter-vehicle error increases and a phase delay increases toward the rear small vehicle group. As shown in FIG. 5, the inter-vehicle error is propagated and amplified. When the threshold value $G_{max}$ of the gain of the inter-vehicle error that is allowable in the small vehicle group is set to "2.2" in advance, as shown in FIG. 4(*a*), the gain of the inter-vehicle errors $\Delta L_1$ to $\Delta L_3$ is equal to or less than the threshold value $G_{max}$, but the gain of the inter-vehicle error $\Delta L_4$ is more than the threshold value $G_{max}$. When the number of vehicles belonging to the small vehicle group is 5, it is proved that the gain of the inter-vehicle error which is not allowable occurs between the fourth vehicle and the fifth vehicle. Therefore, the number of vehicles forming each small vehicle group is set to 4.

The threshold value $G_{max}$ is predetermined by the designer of the vehicle group traveling control system 1 on the basis of a desired design concept and is stored in the information storage unit 10*a* of the vehicle control ECU 10 in advance. In this embodiment, the number of vehicles is set on the basis of the threshold value $G_{max}$ of the gain of the inter-vehicle error. However, the threshold value (for example, −90°) of the phase delay may be set and the number of vehicles in the small vehicle group may be set such that the phase delay is not more than the threshold value of the phase delay.

As such, it is possible to prevent the propagation of a large inter-vehicle error in each small vehicle group by managing the number of vehicles allocated to each small vehicle group. Therefore, it is possible to achieve vehicle group traveling with little disarray in the entire large vehicle group Z.

Second Embodiment

Figure 6:
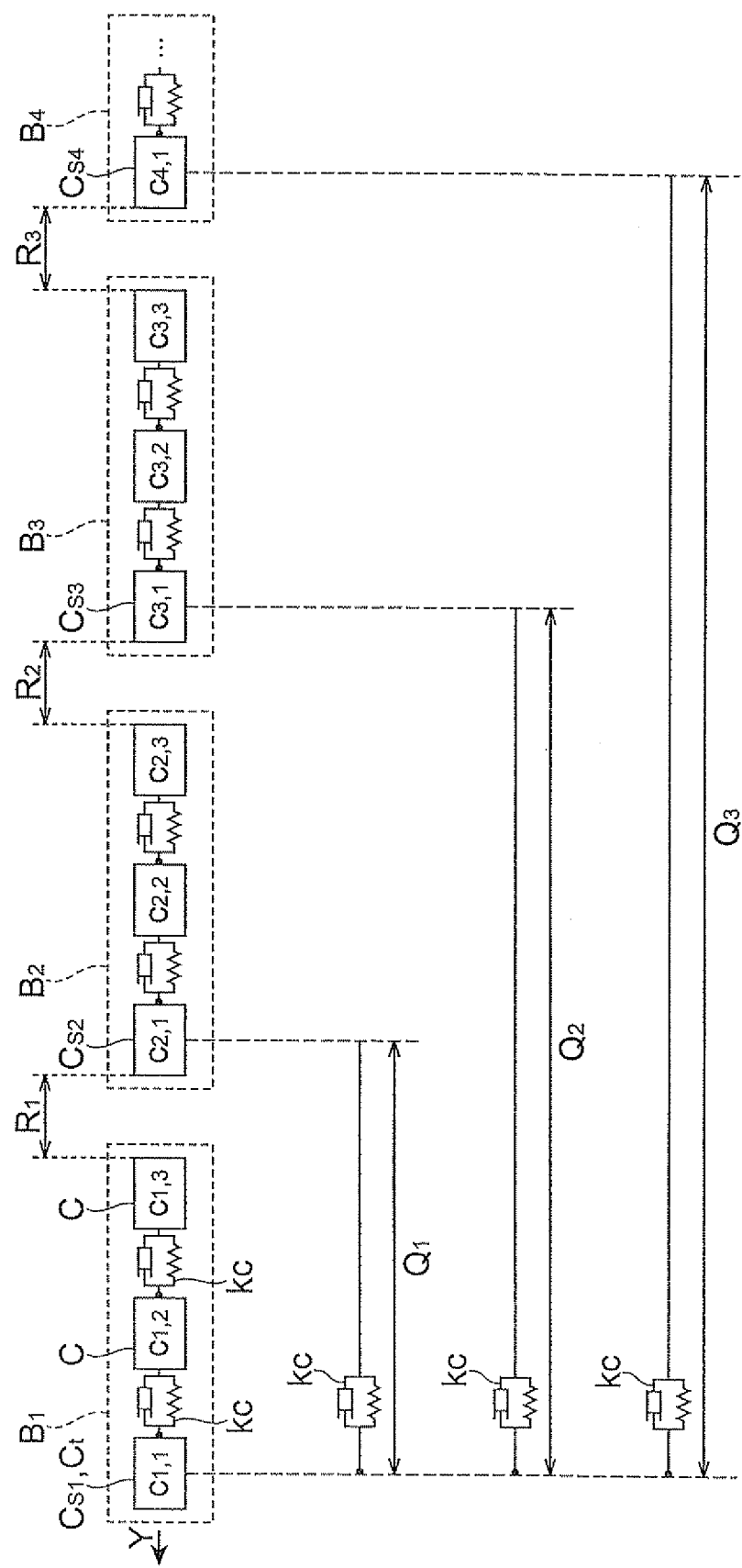
FIG. 6 is a diagram illustrating a plurality of vehicles divided into small vehicle groups in a vehicle group control method according to a second embodiment of the invention.

Next, a vehicle group control method according to a second embodiment of the invention will be described. In the vehicle group control method according to this embodiment, a process of controlling the vehicles in the small vehicle group is the same as that in the vehicle group control method according to the first embodiment, but a small vehicle group control process is different from that in the vehicle group control method according to the first embodiment. Next, the small vehicle group control process in the vehicle group control method according to this embodiment will be described with reference to FIG. 6.

(Small Vehicle Group Control Process)

In this embodiment, similarly to the first embodiment, the first vehicles $C_{1,1}$, $C_{2,1}$, $C_{3,1}$, . . . in the small vehicle groups $B_1$, $B_2$, $B_3$, . . . are selected as representative vehicles $Cs_1$, $Cs_2$, $Cs_3$, of each small vehicle group. Each first vehicle $C_{h,1}$ (h=2, 3, . . .) in each following small vehicle group $B_h$ follows the first vehicle $C_{1,1}$, which is a target vehicle Ct, in the first small vehicle group $B_1$ while controlling the distance $Q_{h-1}$ from the first vehicle $C_{1,1}$. In this case, detailed following traveling control is performed by the same PD control as that in the first embodiment.

According to the vehicle group control method according to this embodiment, the acceleration and deceleration of each first vehicle $C_{h,1}$ in each following small vehicle group $B_h$ is controlled such that the distance $Q_{h-1}$ from the first vehicle $C_{1,1}$ is maintained. As a result, the following small vehicle groups $B_2$, $B_3$, $B_4$, . . . independently travel while the positional relationship between the first small vehicle group $B_1$ and the following small vehicle groups $B_2$, $B_3$, $B_4$, . . . is maintained. Therefore, it is possible to prevent the occurrence of error propagation in which the error in the distances $R_1$, $R_2$, $R_3$, . . . between the small vehicle groups is sequentially propagated to the rear small vehicle group.

In the first and second embodiments, the first vehicles $C_{1,1}$, $C_{2,1}$, $C_{3,1}$, . . . are selected as the representative vehicles of each small vehicle group. However, vehicles other than the first vehicle in each small vehicle group may be selected as the representative vehicle.

Third Embodiment

Next, a vehicle group control method according to a third embodiment of the invention will be described. In the vehicle group control method according to this embodiment, a small vehicle group dividing process of dividing a plurality of vehicles C in a large vehicle group Z into a plurality of small vehicle groups $B_1$, $B_2$, $B_3$, . . . is performed before the process of controlling the vehicles in the small vehicle group and the small vehicle group control process in the first or second embodiment.

(Small Vehicle Group Dividing Process)

Figure 7:
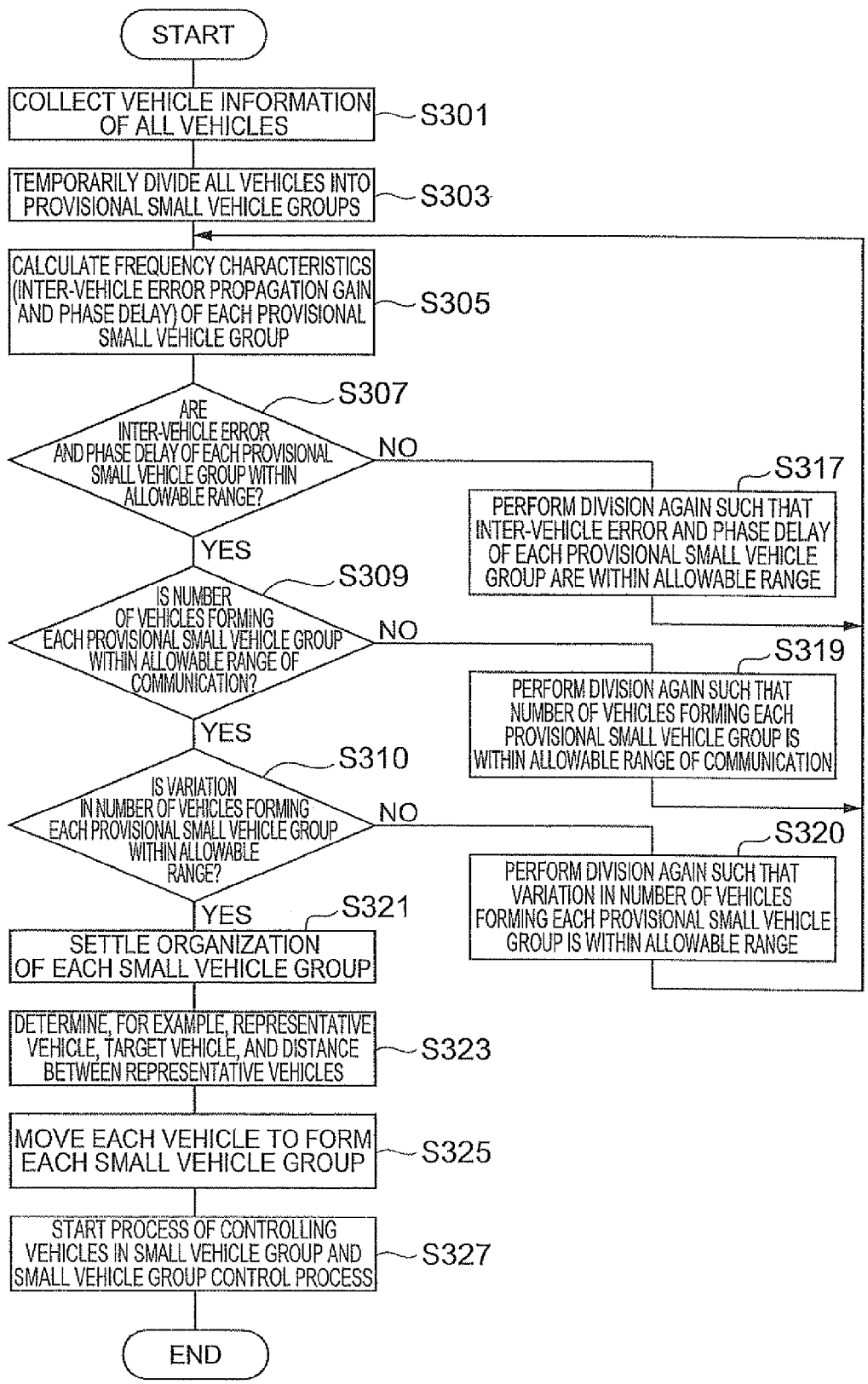
FIG. 7 is a flowchart illustrating a vehicle group control method according to a third embodiment of the invention.

The following small vehicle group dividing process is performed in the vehicle group control system 1 of any one vehicle C among the vehicles C belonging to the large vehicle group Z. As shown in FIG. 7, the vehicle control ECU 10 of the vehicle group control system 1 collects the information of all of the vehicles C belonging to the large vehicle group Z using vehicle-to-vehicle communication (S301). The collected vehicle information includes, for example, the acceleration and deceleration response of each vehicle C, the position of the host vehicle, a communication distance. Then, the vehicle control ECU 10 temporarily divides all of the vehicles C into provisional small vehicle groups each including a plurality of vehicles C (S303). Then, the vehicle control ECU 10 determines whether the provisional division is appropriate. Next, the determination whether the provisional division is appropriate (S305, S307, and S309) will be described in detail.

That is, the vehicle control ECU 10 calculates the string stability (an inter-vehicle error propagation gain and a phase delay) of each of the provisional small vehicle groups on the basis of the collected vehicle information (S305). When the inter-vehicle error and the phase delay that can occur in each of the provisional small vehicle groups are within the allowable range, the vehicle control ECU 10 determines that the temporary division is appropriate. When the inter-vehicle error or the phase delay that can occur in each of the provisional small vehicle groups is beyond the allowable range, the vehicle control ECU 10 determines that the temporary division is not appropriate (S307). When it is determined that the temporary division is not appropriate, the vehicle control ECU 10 performs division anew such that the inter-vehicle error and the phase delay in each small vehicle group are within the allowable range (S317).

When the number of vehicles forming each provisional small vehicle group is too large, the length of the small vehicle group increases and long-distance vehicle-to-vehicle communication is needed. In this case, there is a concern that the stability of communication will be reduced. Therefore, when the number of vehicles forming each provisional small vehicle group is within the allowable range of communication, the vehicle control ECU 10 determines that the temporary division is appropriate. When the number of vehicles forming each provisional small vehicle group is beyond the allowable range of communication, the vehicle control ECU 10 determines that the temporary division is not appropriate (S309). When it is determined that the temporary division is not appropriate, the vehicle control ECU 10 performs division anew such that the number of vehicles forming each provisional small vehicle group is within the allowable range of communication (S319).

When the number of vehicles in the small vehicle group is set on the basis of the gain of the inter-vehicle error considering the acceleration and deceleration response of each vehicle C in the large vehicle group Z, a small number of vehicles tend to be set to the small vehicle group including the vehicles with a low acceleration response and a large number of vehicles tend to be set to the small vehicle group including the vehicles with a high acceleration response. Therefore, in the temporary division (S303), in some cases, the number of vehicles forming each small vehicle group is not uniform, as shown in FIG. 8(*a*) in which a small vehicle group $B_1$ including a small number of (for example, two) large vehicles Ca and a small vehicle group $B_2$ including a large number of (for example, six) small-sized cars Cb are mixed.

As such, when the number of vehicles forming each small vehicle group is not uniform, a communication load is different in each small vehicle group in the process of controlling vehicles in the small vehicle group. For example, when the access method of vehicle-to-vehicle communication is TDMA, two time slots are needed in the small vehicle group $B_1$ and six time slots are needed in the small vehicle group $B_2$. In the small vehicle group $B_2$ with a large communication load, for example, a communication period needs to increase, which prevents an improvement in the stability of the traveling of the small vehicle group.

Therefore, in order to uniformize the communication load in the entire large vehicle group Z, for example, it is preferable that, as shown in FIG. 8(*b*), a vehicle Ca with a low acceleration response be uniformly allocated to each of the small vehicle groups $B_1$ and $B_2$ to average the number of vehicles in each small vehicle group. When a variation in the number of vehicles in the temporarily divided small vehicle groups is within the allowable range, the vehicle control ECU 10 determines that the temporary division is appropriate. On the other hand, when the variation is beyond the allowable range, the vehicle control ECU 10 determines that the temporary division is not appropriate (S310). When it is determined that the temporary division is not appropriate, the vehicle control ECU 10 performs the temporary division again such that the variation in the number of vehicles in each small vehicle group is within the allowable range (S320).

When it is determined in Steps S307 and S309 that the temporary division is appropriate, the organization of each small vehicle group is settled (S321). Then, a representative vehicle and a target vehicle in each small vehicle group are determined and, for example, the distance ($P_1$, $P_2$, $P_3$, . . . in FIG. 1 or $Q_1$, $Q_2$, $Q_3$, . . . in FIG. 2) between the representative vehicles is determined on the basis of the inter-vehicle error propagation ratio of each small vehicle group (S323). The determination information is distributed to all of the vehicles C by vehicle-to-vehicle communication. The vehicle group control system 1 of each vehicle C determines whether the host vehicle is the representative vehicle on the basis of the received determination information. When the host vehicle is the representative vehicle, vehicle-to-vehicle communication with the representative vehicles in other small vehicle groups is performed in Step S327.

Then, each vehicle C is moved on the basis of the settled organization of each small vehicle group and each small vehicle group is formed (S325). Then, the process of controlling the vehicles in the small vehicle group and the small vehicle group control process described in the first or second embodiment start (S327), and the vehicle group traveling of the large vehicle group Z starts.

According to the vehicle group control method of this embodiment, the small vehicle group dividing process makes it possible to form an appropriate number of small vehicle groups each having an appropriate number of vehicles. As a result, it is possible to achieve a uniform communication load and stable vehicle group traveling.

Fourth Embodiment

Figure 9:
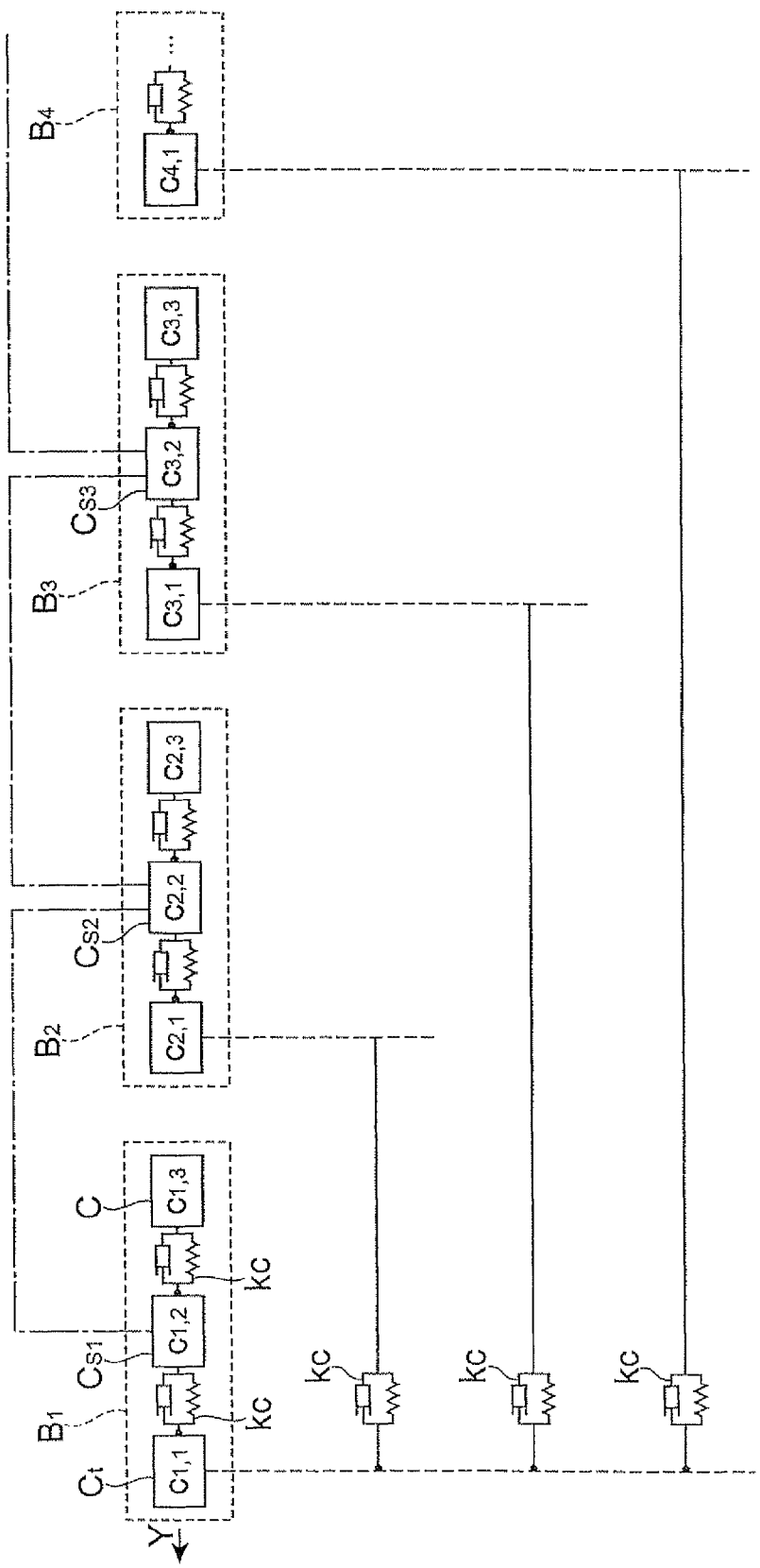
FIG. 9 is a diagram illustrating a plurality of vehicles divided into small vehicle groups in a vehicle group control method according to a fourth embodiment of the invention.

Next, a vehicle group control method according to a fourth embodiment of the invention will be described. In the vehicle group control method according to this embodiment, a process of controlling the vehicles in the small vehicle group is the same as that in the vehicle group control method according to the second embodiment, but a small vehicle group control process is different from that in the vehicle group control method according to the second embodiment. Next, the small vehicle group control process in the vehicle group control method will be described with reference to FIG. 9.

(Small Vehicle Group Control Process)

The second vehicles $C_{1,2}$, $C_{2,2}$, $C_{3,2}$, . . . in the small vehicle groups $B_1$, $B_2$, $B_3$, . . . are selected as the representative vehicles $Cs_1$, $Cs_2$, $Cs_3$, . . . of the small vehicle groups. As represented by a one-dot chain line in FIG. 9, the successive representative vehicles $C_{i,2}$ and $C_{i+1,2}$ perform vehicle-to-vehicle communication (i=1, 2, 3, . . . ). The traveling state information of the first vehicle $C_{1,1}$, which is a target vehicle Ct, is sequentially distributed to the subsequent representative vehicles $C_{2,2}$, $C_{3,2}$, . . . , $C_{i,2}$, $C_{i+1,2}$, . . . through the representative vehicle $C_{1,2}$ by vehicle-to-vehicle communication in the small vehicle group $B_1$ while being relayed. In each following small vehicle group $B_h$ (h=2, 3, ... ), the traveling state information of the vehicle $C_{1,1}$ is transmitted from the representative vehicle $C_{h,2}$ to the first vehicle $C_{h,1}$ by vehicle-to-vehicle communication in the small vehicle group $B_h$. As such, the traveling state information of the first vehicle $C_{1,1}$ is distributed to the first vehicle $C_{h,1}$ in each following small vehicle group $B_h$. Therefore, each first vehicle $C_{h,1}$ can perform following traveling control using the first vehicle $C_{1,1}$ as the target vehicle Ct. In this case, the detailed following traveling control is performed by the same PD control as that in the second embodiment.

Next, the operation and effect of the vehicle group control method according to this embodiment will be described. In the vehicle group control method according to the second embodiment, in particular, the first vehicle $C_{1,1}$, which is the target vehicle Ct, needs to perform vehicle-to-vehicle communication with the first vehicle $C_{h,1}$ in each following small vehicle group, which results in an increase in communication load. In addition, the communication distance from the first vehicle $C_{1,1}$ increases toward the rear small vehicle group. Therefore, it is difficult to ensure the stability of communication. In contrast, according to the vehicle group control method of this embodiment, in particular, in the first small vehicle group $B_1$, the first vehicle $C_{1,1}$ is the target vehicle Ct and the representative vehicle $Cs_1$ is selected from vehicles other than the first vehicle $C_{1,1}$. It is possible to prevent the vehicle $C_{1,1}$ from serving as both the target vehicle and the representative vehicle and thus prevent the concentration of a communication load. In addition, the traveling state information of the vehicle $C_{1,1}$ is sequentially distributed to the rear side while being relayed by each representative vehicle $C_{h,2}$. It is possible to prevent a communication load from being concentrated on a specific representative vehicle. Therefore, the traveling state information of the vehicle $C_{1,1}$ is stably transmitted to the rear small vehicle group that is away from the first small vehicle group $B_1$.

Figure 10:
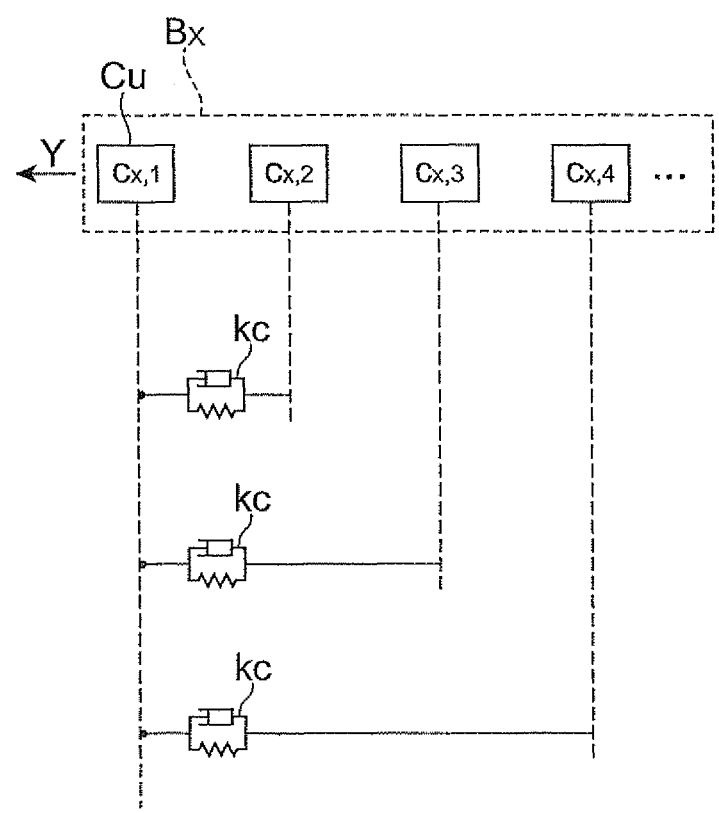
FIG. 10 is a diagram illustrating another control method of the process of controlling the vehicles in the small vehicle group according to the invention.

The invention is not limited to the first to fourth embodiments. For example, the process of controlling the vehicles in each small vehicle group is not limited to the control method according to the above-described embodiments. For example, as shown in FIG. 10, in a given small vehicle group $B_x$, one following target vehicle $C_u$ (for example, the first vehicle) may be selected and the other vehicles may perform PD control on the distance from the following target vehicle $C_u$. In addition, for example, in the process of controlling the vehicles in the small vehicle group, in each small vehicle group, the acceleration and deceleration of all vehicles in the small vehicle group may be optimally controlled (LQ controlled) on the basis of the quantity of state including, for example, all inter-vehicle errors $\Delta L_1$ to $\Delta L_m$ in the small vehicle group. In addition, in the small vehicle group control process, for the target vehicle of each small vehicle group, the acceleration and deceleration of all of the target vehicles may be optimally controlled (LQ controlled) on the basis of the quantity of state including, for example, the error in the distances $P_1$, $P_2$, $P_3$, ... (see FIG. 1) between all of the target vehicles. The control method in the process of controlling the vehicles in the small vehicle group and the control method in the small vehicle group control process may be freely combined with each other.

INDUSTRIAL APPLICABILITY

The invention relates to a vehicle group control method that controls the traveling of a vehicle group including a plurality of vehicles and a vehicle to which the vehicle group control method is applied. According to the invention, it is possible to reduce a vehicle-to-vehicle communication load in traveling control.

The invention claimed is:

1. A vehicle group control method that controls the traveling of a vehicle group including a plurality of vehicles which travel in a row, each of the vehicles including an electronic control unit (ECU), comprising:
   a step of controlling vehicles in each of a plurality of small vehicle groups which are divided from the vehicle group and controlling a relative relationship between the vehicles in each small vehicle group using communication between the ECUs of the vehicles in the corresponding small vehicle group; and
   a small vehicle group control step of controlling a relative relationship between the small vehicle groups using communication between the ECUs of representative vehicles in the small vehicle groups,
   wherein, in the small vehicle group control step, when a host vehicle is the representative vehicle in each of the small vehicle groups other than a first small vehicle group, the traveling of the representative vehicles in the small vehicle groups other than a first small vehicle group is controlled using communication between the host vehicle and the representative vehicle in the small vehicle group that is just in front of the small vehicle group including the host vehicle such that a distance from the representative vehicle in the small vehicle group which is just in front of the small vehicle group including a host vehicle is maintained to be uniform.

2. A vehicle group control method that controls the traveling of a vehicle group including a plurality of vehicles which travel in a row, each of the vehicles including an electronic control unit (ECU), comprising:
   a step of controlling vehicles in each of a plurality of small vehicle groups which are divided from the vehicle group and controlling a relative relationship between the vehicles in each small vehicle group using communication between the ECUs of the vehicles in the corresponding small vehicle group; and
   a small vehicle group control step of controlling a relative relationship between the small vehicle groups using communication between the ECUs of representative vehicles in the small vehicle groups,
   wherein, in the small vehicle group control step, the traveling of each of the representative vehicles other than the representative vehicle in the small vehicle group including a target vehicle which is selected from the vehicles in the vehicle group is controlled such that a distance between the target vehicle and each of the representative vehicles other than the representative vehicle in the small vehicle group including the target vehicle is maintained to be uniform, using communication between the representative vehicle in the small vehicle group including the target vehicle and each of the representative vehicles other than the representative vehicle in the small vehicle group including the target vehicle.

3. A vehicle group control method that controls the traveling of a vehicle group including a plurality of vehicles, each of the vehicles including an electronic control unit (ECU), comprising:
   a step of controlling vehicles in each of a plurality of small vehicle groups which are divided from the vehicle group and controlling a relative relationship between the vehicles in each small vehicle group using communication between the ECUs of the vehicles in the corresponding small vehicle group; and a small vehicle group control step of controlling a relative relationship between the small vehicle groups using communication between the ECUs of representative vehicles in the small vehicle groups, wherein, in the small vehicle group control step, a relative relationship between a target vehicle selected from the vehicles in the vehicle group and each of the representative vehicles other than the representative vehicle in the small vehicle group including the target vehicle is controlled using communication between the representative vehicle in the small vehicle group including the target vehicle and each of the representative vehicles other than the representative vehicle in the small vehicle group including the target vehicle, in the small vehicle group including the target vehicle, the target vehicle is a first vehicle in the small vehicle group, and the representative vehicle is selected from vehicles other than the first vehicle.

4. A vehicle group control method that controls the traveling of a vehicle group including a plurality of vehicles, each of the vehicles including an electronic control unit (ECU), comprising:

a step of controlling vehicles in each of a plurality of small vehicle groups which are divided from the vehicle group and controlling a relative relationship between the vehicles in each small vehicle group using communication between the ECUs of the vehicles in the corresponding small vehicle group; and a small vehicle group control step of controlling a relative relationship between the small vehicle groups using communication between the ECUs of representative vehicles in the small vehicle groups, wherein, in the step of controlling the vehicles in the small vehicle group, a distance between the vehicles in the small vehicle group is controlled, and the number of vehicles in each small vehicle group is determined by an error in a distance between the vehicles behind a first vehicle that can occur in correspondence with the acceleration of the first vehicle in the small vehicle group in the step of controlling the vehicles in the small vehicle group.

5. The vehicle group control method according to claim 1, wherein, in the step of controlling the vehicles in the small vehicle group, each distance between the vehicles in the small vehicle group is controlled, and in the small vehicle group control step, the distance between the representative vehicles is controlled such that a distance between the successive small vehicle groups is different from a distance between the vehicles in each small vehicle group.

6. A vehicle group control method that controls the traveling of a vehicle group including a plurality of vehicles, each of the vehicles including an electronic control unit (ECU), comprising:

a step of controlling vehicles in each of a plurality of small vehicle groups which are divided from the vehicle group and controlling a relative relationship between the vehicles in each small vehicle group using communication between the ECUs of the vehicles in the corresponding small vehicle group; and a small vehicle group control step of controlling a relative relationship between the small vehicle groups using communication between the ECUs of representative vehicles in the small vehicle groups, wherein, in the small vehicle group control step, the relative relationship between the representative vehicles is controlled such that a distance between the successive small vehicle groups is a predetermined target distance, and the predetermined target distance is set on the basis of an inter-vehicle error propagation ratio, which is the propagation ratio of the error in an inter-vehicle distance propagated to the vehicles that are behind each vehicle, in the step of controlling the vehicles in the small vehicle group.

7. A vehicle that is used in a vehicle group control method of controlling the traveling of a vehicle group including a plurality of vehicles which travel in a row, each of the vehicles including an electronic control unit (ECU), wherein the vehicle group control method includes:

a step of controlling vehicles in each of a plurality of small vehicle groups which are divided from the vehicle group and controlling a relative relationship between the vehicles in each small vehicle group using communication between the ECUs of the vehicles in the corresponding small vehicle group; and a small vehicle group control step of controlling a relative relationship between the small vehicle groups using communication between the ECUs of representative vehicles in the small vehicle groups, and when a host vehicle is the representative vehicle in each of the small vehicle groups other than a first small vehicle group, the traveling of the host vehicle is controlled using communication between the host vehicle and the representative vehicle in the small vehicle group that is just in front of the small vehicle group including the host vehicle such that a distance between the host vehicle and the representative vehicle is maintained to be uniform.

* * * * *